Figure 1:
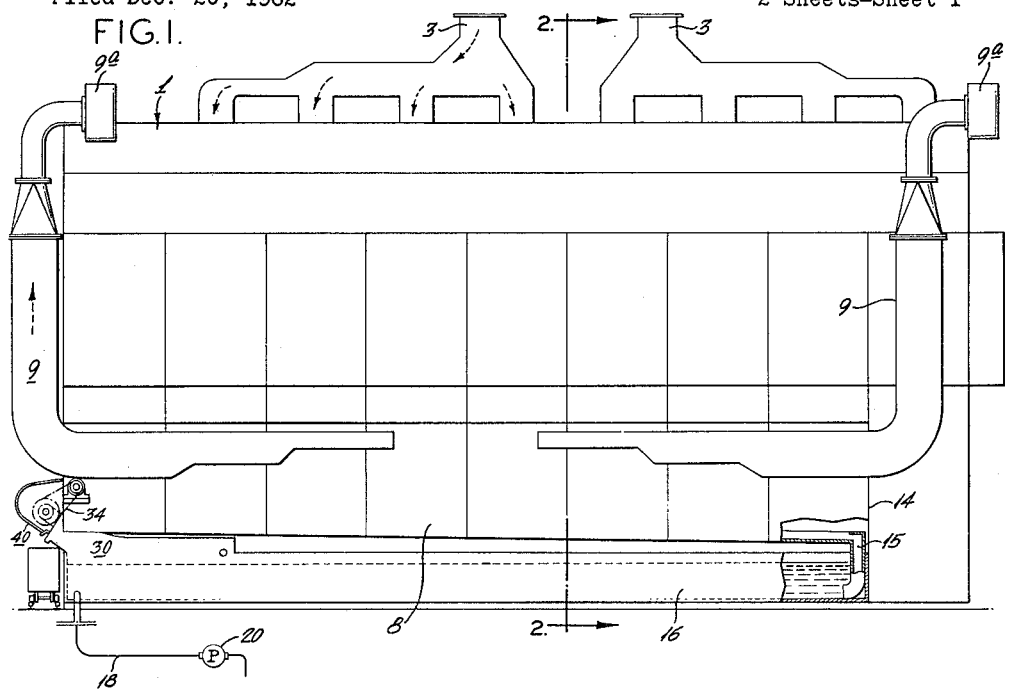

Feb. 2, 1965   G. WILHELMSSON ETAL   3,168,031
ARRANGEMENT IN SPRAY-PAINTING PLANTS
Filed Dec. 20, 1962   2 Sheets-Sheet 1

INVENTORS:
GUNNAR WILHELMSSON
ÅKE ARBORGH
JAN SJÖGREN
BY Howson & Howson
ATTYS.

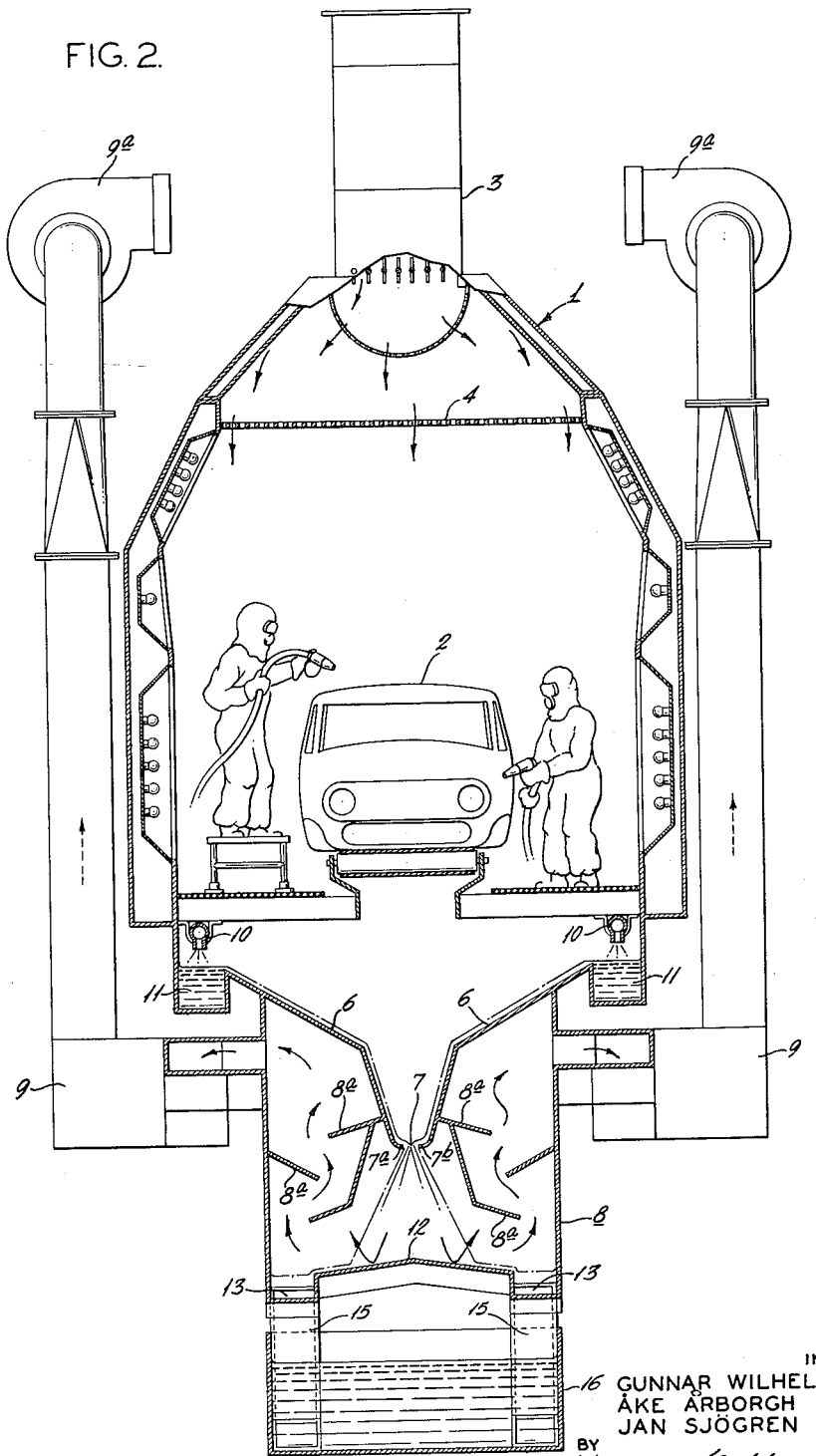

United States Patent Office 3,168,031
Patented Feb. 2, 1965

3,168,031
ARRANGEMENT IN SPRAY-PAINTING PLANTS
Gunnar Wilhelmsson, Smalands Taberg, Åke Arborgh, Jonkoping, and Jan Sjögren, Nacka, Sweden, assignors to Aktiebolaget Svenska Flaktfabriken, Stockholm, Sweden
Filed Dec. 20, 1962, Ser. No. 246,161
Claims priority, application Sweden, Dec. 22, 1961, 12,899/61
2 Claims. (Cl. 98—115)

This invention relates to an arrangement in a plant for spray-painting objects which are conveyed through the plant in a continuous or intermittent manner. The plant comprises a closed channel having air supply means for supplying heated ventilating air which may be filtered, and air discharge means for discharging the air. The air supply means is further provided with a perforated roof section adapted to allow uniform distribution of the supplied air across the entire horizontal cross-section of the channel. The bottom of the channel is located below the conveying and operating plane and terminates into one or more constricted longitudinal openings for egress of the ventilating air directly to a drop separator having substantially the same length as the channel. Connected to the drop separator is suction means adapted to provide a differential pressure between the channel and the drop separator to allow ventilating air flow from the channel through the separator. The plant is further provided with means for supplying a cleaning liquid which is introduced into the channel in such a manner that it sweeps over the side walls of the lower part of the channel in the form of a covering liquid film. The air flow through the constricted longitudinal openings, now laden with paint particles, mixes with the cleaning liquid, thereafter the ventilated air is separated from the liquid and accompanying paint particles in the drop separator.

In plants constructed in accordance with the foregoing, it is difficult to collect and remove free paint particles from the channel in an effective way. The more effective the removal of paint particles from the section of the channel wherein objects are being painted, the greater the quantity of paint agglomerated with the cleaning liquid and, consequently, the greater the requirement of thorough separation in a paint separation tank if the cleaning liquids is to be reused.

In accordance with the foregoing an object of the present invention is to solve the problem of separation of paint from the cleaning liquid in a simple and effective manner.

In accordance with the invention the bottom of the drop separator slopes towards one end of the plant so that the mixture of paint and cleaning liquid runs into a paint separation tank. In the preferred embodiment of the invention the separation tank is located directly beneath the drop separator in order to conserve floor space but of course could be located to the side of the drop separator. The separation tank extends to the opposite end of the plant where at least one pump is provided for the circulation of the cleaning liquid. At the same end of the separation tank where a suction is taken for recirculating cleaning liquid, liquid defoaming means projects downwardly into the tank for removing paint particles by defoaming the liquid surface. By placing the defoaming means at the opposite end of the separation tank from the terminus of the sloped wall where the paint and liquid mixture run into the separation tank a sufficiently long separation time is insured.

Figure 3:
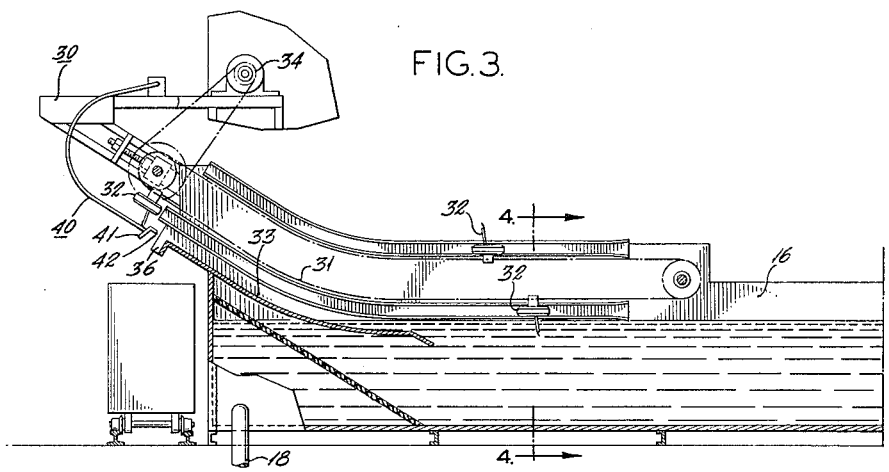
Figure 4:
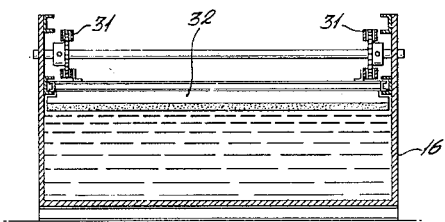

Other objects and a fuller understanding of the invention may be had by referring to the following description and claims taken in conjunction with the accompanying drawings in which:

FIG. 1 is a side elevation of a spray cleaning plant embodying the present invention, with a portion cut away;
FIG. 2 is a transverse sectional view taken along line 2—2 of FIG. 1;
FIG. 3 is an enlarged fragmentary view illustrating a portion of the spray painting plant shown in FIG. 1; and
FIG. 4 is a transverse section taken on line 4—4 of FIG. 3.

Referring now to the drawing, 1 is a closed channel adapted for spray-painting objects 2 which are conveyed in a continuous manner through the channel. Ducts 3 supply heated ventilating air which is distributed uniformly across the entire channel through filter mats 4 held in place by a frame 5. At the bottom of the channel, V-shaped bottom walls 6, located below the conveying and operating plane, terminate in a constricted longitudinal opening 7 for discharging ventilating air into a drop separator 8. The constricted longitudinal opening 7 is defined by inwardly projecting flanges 7a and 7b which are transverse to the ventilating air flow. The drop separator underlies the channel substantially the entire length of the channel. The drop separator is provided with air discharge ducts 9 which connect to suction means 9a to provide a differential pressure between the channel and drop separator to allow ventilating air flow from the former through the latter. On the side walls of the drop separator are disposed sloped baffle plates 8a which scrub the ventilating air on its way to the air discharge ducts 9 to separate the water and paint agglomeration from the air.

To prevent paint from sticking to the V-shaped bottom walls 6 as the air carries the fine paint particles towards the drop separator, liquid supply means cause cleaning liquid to sweep over the walls in the form of a covering liquid film. To this end the liquid supply means comprises pipes 10 which supply a quantity of cleaning liquid such as water to slots 11 which are disposed longitudinally in the channel at the upper extremity of the V-shaped bottom walls so that as the slots fill up with cleaning liquid, the liquid will overflow and thereby dispose a film over the walls. As the liquid film progresses towards the constricted opening 7, the flanges 7a and 7b cause the liquid to be injected into the air stream and atomized therein. The paint particles agglomerize with the atomized liquid, the mixture thereafter proceeding through the drop separator for separation as heretofore described.

As is illustrated in FIG. 1 the bottom wall 12 of the drip separator 8 is provided with at least one groove which extends along the longitudinal bottom wall and is inclined towards one end 14 of the spray-painting plant to afford a run off for the agglomerated paint and water mixture separated from the air in the drop separator. In the present embodiment of the invention two grooves 13 are provided in the bottom wall 12 having an outlet 15 at the end 14 of the plant which leads to a liquid cleaning tank 16 which is located directly beneath the drop separator. Of course if the local conditions permit or require, the tank may also be located externally of the plant.

The liquid and paint mixture supplied to the tank at 14 is caused to flow towards the opposite end of the tank 16 by a circulating pump 20 which takes suction through a pipe 18. Thereafter, the plant is separated by a defoaming means 30 and the cleaning liquid is then circulated back to the liquid supply means.

In the present embodiment, and in accordance with conventional practice, the defoaming means 30 has at least one skimmer 32 which acts upon the the surface of the cleaning liquid to remove paint particles suspended near and on the surface. Thereafter skimmer cleaning means 40 clean the skimmers and the skimmers are again moved into a position to remove paint particles which have been brought into the vicinity of the skimmers 32 by the action of the cleaning means circulating pump 20. To this end, and as is best illustrated in FIGS. 3 and 4 the defoaming means 30 comprises a conveyor 31 which in the present instance overlies the cleaning liquid and to which is attached a plurality of skimmers 32 which dip into the cleaning liquid and remove paint particles floating near and on the surface as the conveyor is operated. The conveyor is driven in a clockwise manner, as viewed in FIG. 3, by driving means 34. Spaced from the conveyor a distance substantially equal to the height of a skimmer 32 and projecting into the tank 16 is a sludge ramp 33. As the conveyor is operated by the drive means 34, the skimmers 32 carry the paint particles suspended on and near the surface of the liquid up the sludge ramp 33 through a sludge chute 36 and thereafter into a sludge receptacle for disposing of the paint particles. In communication with the sludge ramp, and spaced a short distance from its terminus is skimmer cleaning means 40, comprising a scraper 41 having a scraping edge 42 which causes any particles sticking to the skimmers to be knocked off the skimmers and dropped into the sludge receptacle.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What we claim is:

1. A plant for spray-painting and the like comprising a longitudinally extending channel, air supply means in communication with said channel adapted to provide a flow of air across objects being painted in said channel, air discharge means at the bottom of said channel for discharging said ventilating air, said air discharge means comprising substantially V-shaped, longitudinally extending bottom walls, terminating in a constricted slot-shaped opening extending substantially the length of said channel, a drop separator underlying said discharge means and connected thereto, suction means connected to said drop separator adapted to provide a differential pressure between said channel and said drop separator to allow ventilating air flow from said channel through said drop separator, liquid supply means positioned along the upper portion of said V-shaped bottom walls and adapted to supply a cleaning liquid to sweep over the V-shaped bottom walls of said channel so that as said ventilating air laden with paint particles passes through said constricted opening said liquid is mixed into said ventilating air entraining paint particles therein, said drop separator operable to separate said ventilating air from said liquid in which is entrained paint particles, said drop separator including a bottom wall extending longitudinally of said plant beneath said opening to catch said paint-laden liquid and sloped toward one end of said plant so as to afford a run off for said liquid, a paint separation tank underlying said bottom wall and having a longitudinal extent substantially the same as said channel, said tank connected to the terminus of said sloped bottom wall at said one end of said plant, defoaming means extending into said paint separation tank at the end opposite from said one end to remove paint particles from the surface of the liquid pump means connected to said tank to cause the liquid to move from said one end to said opposite end whereby upon separation of the paint from the liquid, said separated liquid is recycled for use in said liquid supply means.

2. A plant for spray-painting and the like in accordance with claim 1 wherein said bottom wall has at least one means defining a groove extending longitudinally of said plant and inclined towards said one end to afford a run off for said paint-laden liquid.

References Cited by the Examiner

UNITED STATES PATENTS

| | | | |
|---|---|---|---|
| 2,086,514 | 7/37 | Saunders | 98—115 |
| 2,805,844 | 10/57 | McMasters | 98—115 |
| 3,085,793 | 4/63 | Pike | 261—112 |
| 3,112,352 | 11/63 | Krantz | 261—112 X |

ROBERT A. O'LEARY, *Primary Examiner.*